United States Patent [19]

Crowley

[11] 4,302,549

[45] Nov. 24, 1981

[54] METHOD OF PREPARING EXPANDABLE POLYSTYRENE

[76] Inventor: Richard P. Crowley, 65 East India Row, Boston, Mass. 02110

[21] Appl. No.: 141,632

[22] Filed: Apr. 18, 1980

[51] Int. Cl.$^3$ .................. C12P 33/14; F27B 14/00; C04B 33/32

[52] U.S. Cl. .................. 521/57; 432/13; 264/51; 264/300; 264/DIG. 9; 521/56; 521/59; 521/60; 521/154

[58] Field of Search .......... 432/13; 264/300, DIG. 9, 264/51; 521/56, 57, 58, 60

[56] References Cited

U.S. PATENT DOCUMENTS 3,086,885  4/1963  Jahn ........................ 521/56
3,751,218  8/1973  Cherenson ............... 432/134
4,017,427  4/1977  Granda et al. ............ 521/57

*Primary Examiner*—John J. Camby
*Attorney, Agent, or Firm*—Richard P. Crowley

[57] ABSTRACT

A process for the expansion of an expandable, polymeric, bead material by exposing the bead material to steam at an elevated temperature, to effect the expansion of the bead material into a polymeric bead material form, while tumbling the bead material during expansion to prevent fusion, the improvement which comprises: employing as a lubricant for the bead material a lubricant material which, on exposure to the steam and prior to the end of the expansion of the bead material, is changed in lubricant characteristics, to provide an expanded, polymeric foam bead material having a reduced surface lubricity.

15 Claims, No Drawings

METHOD OF PREPARING EXPANDABLE POLYSTYRENE

BACKGROUND OF THE INVENTION

Expandable polymeric bead or pellet material has been employed to prepare a variety of foam plastic products. In particular, solid, expandable, polystyrene pellets have been expanded for use in closed or open molds to form coffee cups and other molded foam articles, and also for use in preparing free-flowing, highly expanded foam pellets of a variety of shapes for cushioning and packaging purposes.

The expandable polymeric pellets typically contain in their preparation a blowing agent, so that, when the pellets are exposed to heat, typically by the application of steam, the pellets expand to many times their size; that is, ten to fifty times. For example, expandable, polystyrene, solid pellets are used to prepare free-flowing, expandable, polystyrene foam packaging. Such expandable pellets are expanded by the application of heat through the use of steam in a tumbling drum. The pellets are expanded while tumbling or being agitated in the expansion phase, in order to prevent fusing together of the individual pellets.

One device employed to expand polystyrene pellets is described, for example, in U.S. Pat. No. 3,751,218, issued Aug. 7, 1973, hereby incorporated by reference. This device employs a plurality of paddles on thin rods extending from the internal surface of a horizontal revolving drum, to provide for a tumbling of the pellets and moving of the pellets from the inlet to the outlet of the drum, while the pellets are subjected to steam to effect the expansion of the pellets. The expandable polystyrene pellets may be fed by a helical-screw or other metering feed pump to the drum inlet and the pellets permitted to fall by gravity into the interior of the drum. Usually, the expandable pellets are solid and have a density of from about 35 to 50 pounds per cubic foot at the inlet and are expanded in one or more passes through the interior of the drum, usually in a time period of from 1 to 10 minutes; for example, 1 to 3 minutes, to a density of from about 1.0 to 1.5 pounds per cubic foot employing a temperature of from about 96° C. to 99° C. The expanded foam pellets of the first pass are usually subjected to a second pass through the steam-expanding tumbling apparatus, in order to reduce the density of the foam pellets further to about 0.5 to 0.6 or less, with a time period generally of less than about 3 minutes in the second pass. Often, it is desirable to provide an additional pass through the expanding device, to reduce the foam density to the lowest level possible; for example, as low as 0.3 pounds per cubic foot, with a residence time of from 1 to 2 minutes.

The expandable polystyrene pellets being manufactured may contain, as part of the expandable composition, a small, but effective, amount of a lubricant, such as, for example, ten to three hundred parts per million, in order to permit the expandable pellets to tumble freely; that is, to provide for a free-flowing, nonfusing, tumbling action by the pellets during the expansion process. In some cases, the lubricant is added directly to the solid expandable pellets after manufacture, such as by blending the lubricant with the pellet polymer composition, or just before feeding the pellets into the steam-expanding tumbling drum. A typical lubricant employed, either in the composition or used to coat the exterior surface of the solid, expandable, polystyrene pellets, would be a metal soap, such as a calcium or zinc stearate.

In some cases, a lubricant is not employed; however, the omission of a coating lubricant often reduces the production flow rate of expansion. For example, in an expansion device of the type described, the use of a lubricant permits production rates of over 500 to 700 pounds per hour, while the omission of a lubricant often reduces the rate to 300 to 500 pounds per hour and introduces pellet-fusion problems. Thus, a lubricant, while adding to the cost, provides for a better tumbling action, but the use of a lubricant causes some difficulty in the use of the foam pellet material.

The loose, expandable polystyrene pellets used, for example, for packaging material, comprise a thermoplastic polymer, such as polystyrene, which has a chemical or mechanical blowing agent incorporated therein and in an amount sufficient to effect the desired expansion. Typical blowing agents include those agents which decompose and provide an inert expandable gas, or those liquid volatile agents which expand or are volatilized on the application of heat, such as low-molecular-weight hydrocarbon liquid, such as isopentane, butane, pentane, or fluorocarbons or any combination thereof.

One of the problems associated with the use of metal stearates, such as zinc stearate, as a polystyrene pellet lubricant is the effect of the lubricant on the free-flowing foam pellets for packaging. The metal stearate is employed as a lubricant to provide a good tumbling action in the expansion process of the expandable pellets. However, the effect of the lubricant on the expanded free-flowing foam particles and the packaging or cushioning of articles therein is to permit the outside of the expandable foam pellets to be of higher lubricity than is desired. Typically, for example, when zinc stearate is employed as a lubricant which is dusted over expandable pellets, the resulting free-flowing foam pellets, used in the packaging material, cause the package to move downwardly in the foam mass, due to the slipperiness of the foam pellets. The package then tends to move downwardly in the exterior container and to rest on the bottom of the container in which the article to be packaged is placed. This disadvantage is particularly evident with heavier objects which are packaged in the free-flowing foam pellets. When the article moves to or near the bottom of the packaging container or to the side, the article is more likely to be damaged during transportation, due to the lack of the surrounding foam cushion and insulation of the foam pellets.

SUMMARY OF THE INVENTION

My invention relates to a method for the preparation of expanded foam pellets for use as packaging material and to the expanded foam particles produced thereby. In particular, my method concerns the expansion of expandable polystyrene pellets employing a steam-degradable lubricant and the foam polystyrene particles so produced.

My invention provides for free-flowing, expandable, foam pellets which may be more effective as packaging material through the employment of lubricants which permit the free tumbling action, while the solid expandable pellets are being passed through the expansion cycle, and which lubricants are degraded by heat, particularly degraded by steam, such as through the action of hydrolysis, at the expansion temperatures and during the expansion phase and time of passing through the expansion drum, so that the lubricant is all or substantially degraded in the expansion process. Thus, my invention provides for a particular method by which the lubricant employed is effectively degraded, destroyed or otherwise reduced in lubricity properties in a short period of time toward the end of the first or the second expansion phase of the polystyrene pellets, so that the resulting free-flowing foam pellets do not have a high degree of lubricity on the surface thereof, and may be employed more effectively as a free-flowing packaging and cushioning material.

I have discovered that, by employing steam-degradable lubricants with the expandable polystyrene pellets, the desirable free-flowing properties of the pellets during expansion in the expanding device are substantially retained, with the resulting free-flowing foam pellets having lower and reduced lubricant properties. Thus, my invention is directed toward providing a class of lubricants for expandable polystyrene of selected properties, whereby the lubricant, during the expansion pass and typically during the pass between 1 minute or more likely 2 to 5 minutes on exposure to steam temperatures employed or heat where heat is employed, becomes reduced in lubricant properties through a change in chemical or molecular structure, so that the resulting foam pellets are more effective as packaging media. The type of lubricants suitable for use, in accordance with my invention, includes those compounds which exhibit lubricant properties when applied to the surface of the polystyrene expandable pellets or when incorporated within the solid, expandable pellets, and yet which lubricant materials rapidly deteriorate on exposure to steam at temperatures of above 90° C., so that they become effective lubricants during about the first 50% to 80% of the time of passage through the expanding drum, and, thereafter, rapidly degrade in lubricant properties. Unlike the metal stearates, such as zinc stearate, which are substantially stable at steam temperatures and during and after the expansion phases, the lubricants of my invention are steam-hydrolyzable within typically after 2 minutes of exposure to steam at temperatures of 94° C. to 98° C. and which lose all or substantially all of the lubricant properties and are not stable, as are the metal stearates presently employed.

The lubricants useful in my invention may be incorporated during the manufacture of the expandable pellets or may be employed by coating the exterior of the solid expandable pellets just prior to expansion. The lubricants may be employed in liquid form, such as by spraying the exterior of the expandable pellets, or more typically by applying a powder onto the exterior of the pellets just prior to expansion. The lubricants employed may be used alone or in combination with other materials, such as a solvent or fillers, or more particularly employed with solid, finely-divided, particulate materials as bulking agents, such as finely-divided silica, corn starch, diatomaceous earth, talc and the like. The amount of the lubricant may vary as desired and as practiced, in order to obtain the desired lubricant properties in the early phases of the expansion.

One class of lubricants which may be employed for the purposes of my invention includes silicone lubricants, such as hydrolyzable organic silicone-glycol surfactants, or quaternary-ammonium fatty acids or other long-chain cationic quaternary-ammonium compounds, such as, for example, fatty radicals; for example, those long-chain oleate, myristate, stearate or other quaternary-ammonium cationic surfactants. The anion of the quaternary-ammonium compound may vary as desired, but typically a short-chain fatty-acid anion, such as an acetate, or an inorganic anion which is relatively inert, such as a hydroxy phosphate, or halide or the like, may be employed. One preferred class of quaternary-ammonium compounds, which are steam-hydrolyzable and which provide excellent lubricity, as well as highly efficient antistatic properties, includes those polyalkoxy quaternary-ammonium compounds, such as acetates, phosphates and the like. More particularly, the $C_2$–$C_4$ polyalkoxy compounds, such as the polypropoxy and polyethoxy quaternary-ammonium acetates, may be employed.

It has been found that the spraying on the exterior of the expandable polystyrene pellets with a water-dispersable or alcohol-ethanol solution of a polypropoxy quaternary-ammonium acetate identified as Emcol CC-55 (Emcol being a registered trademark of Witco Chemical Co.), in an amount based on the weight of the solid expandable pellets of from ten to one hundred parts per million, provides for an effective antistatic lubricant for the pellets. The expandable, solid, polystyrene pellets, when coated with the polypropoxy quaternary-ammonium acetate, provide for a free-tumbling, antistatic action during the initial phases through a first pass of an expansion device, when subjected to steam for periods of from 1 to 3 minutes at 95° C. to 98° C. The resulting foam pellets have a reduced lubricity over the pellets placed into the inlet of the expanding device, and, therefore, are more suitable for use as a packaging material, due to the reduction in lubricity after passing through the expansion process.

My method has been described in connection with a specific embodiment; however, it is recognized that various other steam-hydrolyzable lubricant materials may be employed and various changes and modifications in the illustrative example may be made by those persons skilled in the art, all without departing from the spirit and scope of my invention.

What I claim is:

1. In a process for the expansion of an expandable, polymeric, bead material by exposing the bead material to steam at an elevated temperature, to effect the expansion of the bead material into a polymeric, free-flowing foam, particulate, bead material, while tumbling the bead material during expansion to prevent fusion, the improvement which comprises:

employing as a lubricant for the bead material a steam-degradable lubricant material which, on exposure to the steam and prior to the end of the expansion of the bead material, is substantially diminished in lubricant characteristics, to provide an expanded, polymeric foam bead material having a reduced surface lubricity.

2. The process of claim 1 wherein the expandable polymeric bead material comprises expandable polystyrene bead material.

3. The process of claim 1 wherein the bead material is exposed to steam at a temperature of from about 95° C. to 99° C.

4. The process of claim 1 which includes passing the expandable polymeric bead material through a horizontal revolving drum with internal mixing paddles therein and having an inlet and an outlet, wherein the expandable polymeric material is introduced into the inlet and the expanded polymeric bead foam material is withdrawn from the outlet.

5. The process of claim 1 wherein the time for the expansion of the expandable polymeric bead material to its expandable form ranges from about 1 to 3 minutes.

6. The process of claim 1 wherein the amount of lubricant material employed ranges from about ten to three hundred parts per million, based on the weight of the expandable polymeric bead material.

7. The process of claim 1 wherein the expandable polymeric bead material is coated with the lubricant material, to form an exterior coating thereon prior to expansion of the polymeric bead material.

8. The process of claim 1 wherein the lubricant material is incorporated as a part of the expandable polymeric bead material during manufacture of the bead material.

9. The process of claim 1 wherein the lubricant material comprises a steam-hydrolyzable lubricant material which, on exposure to steam, hydrolyzes into a material having a substantially lower degree of lubricity.

10. The process of claim 1 wherein the lubricant material comprises a long-chain, quaternary-ammonium or silicone lubricant material.

11. The process of claim 1 wherein the lubricant material comprises a polyalkoxy quaternary-ammonium material.

12. The process of claim 1 wherein the lubricant material comprises a polypropoxy quaternary-ammonium acetate lubricant material.

13. In a process for the expansion of expandable polystyrene bead material by exposing the polystyrene bead material to steam at a pressure of less than 100 psi and at a temperature of from about 95° C. to 99° C. for a period of time of from about 1 to 5 minutes, while tumbling the polystyrene bead material within a revolving drum having an inlet and an outlet, the tumbling of the drum preventing the fusion of the polystyrene bead material during the expansion of the bead material within the drum, and wherein the expandable polystyrene bead material is introduced into the inlet and an expanded, polystyrene foam material, suitable for use as loose-fill packaging, is withdrawn from the outlet, the improvement which comprises:

employing as an exterior surface coating on the expandable polystyrene bead material a steam-hydrolyzable, long-chain, quaternary-ammonium lubricant material, which material, on exposure to steam and prior to the withdrawal of the expanded polystyrene foam material from the outlet of the revolving drum, loses a substantial portion of its lubricity characteristics, thereby providing for the recovery of an expanded, free flowing, polystyrene foam bead material suitable for use as a packaging material.

14. The expanded polystyrene foam material produced by the process of claim 13.

15. The expanded polystyrene foam material produced by the process of claim 1.

* * * * *